(12) United States Patent
Oda et al.

(10) Patent No.: US 7,444,899 B2
(45) Date of Patent: Nov. 4, 2008

(54) SHIFTING APPARATUS FOR AN AUTOMATIC TRANSMISSION OF VEHICLE

(75) Inventors: Shigeaki Oda, Shizuoka-ken (JP); Masayuki Shinmura, Shizuoka-ken (JP)

(73) Assignee: Kabushiki Kaisha Atsumitec (JP)

( * ) Notice: Subject to any disclaimer, the term of this patent is extended or adjusted under 35 U.S.C. 154(b) by 773 days.

(21) Appl. No.: 10/963,261

(22) Filed: Oct. 12, 2004

(65) Prior Publication Data
US 2005/0081671 A1  Apr. 21, 2005

(30) Foreign Application Priority Data
Oct. 15, 2003  (JP) ............................. 2003-355040

(51) Int. Cl.
*F16H 59/04* (2006.01)
*G05G 5/06* (2006.01)
(52) U.S. Cl. .................................. 74/473.21; 74/473.3
(58) Field of Classification Search . 74/473.21–473.23, 74/473.28, 473.3, 473.33, 529, 537, 534, 74/535, 538; 192/220–220.5
See application file for complete search history.

(56) References Cited

U.S. PATENT DOCUMENTS 5,044,220 A * 9/1991 Raff et al. ................. 74/473.18
5,255,570 A * 10/1993 Shirahama et al. ....... 74/473.23
6,422,106 B1 * 7/2002 Lee ......................... 74/473.18

FOREIGN PATENT DOCUMENTS

| JP | 08-132908 | 5/1996 |
|----|-----------|--------|
| JP | 10-053040 | 2/1998 |
| JP | 2002-019483 | 1/2002 |

* cited by examiner

*Primary Examiner*—Richard W L Ridley
*Assistant Examiner*—Terence Boes
(74) *Attorney, Agent, or Firm*—Harness, Dickey & Pierce, P.L.C.

(57) ABSTRACT

A shifting apparatus for an automatic transmission of a vehicle has a shift lever; a push knob (1*d*) operable in a pushing manner; an erroneous operation preventing window (12); a rod lock pin (1*c*) adapted to be lowered by the pushing down operation of the push knob (1*d*); and a lock mechanism operated by the descending motion of the rod lock pin (1*c*) to release the engagement with the erroneous operation preventing window (12) in order to enable the swing motion of the shift lever (1) from the predetermined position. The lock mechanism includes a pivot member pivotable around a pivot shaft on the shift lever (1) and normally urged toward a side limiting the swing motion of the shift lever (1). The pivot member has a first branch (8*b*) adapted to engage and disengage the erroneous operation preventing window (12) according to its pivot motion. The lock mechanism is pivoted with its first branch (8*b*) being pushed by the bottom end of the rod lock pin (1*c*) to release the engagement of the first branch (8*b*) from the erroneous operation preventing window (12) when the rod lock pin (1*c*) is lowered

3 Claims, 10 Drawing Sheets

SHIFTING APPARATUS FOR AN AUTOMATIC TRANSMISSION OF VEHICLE

CROSS-REFERENCE TO RELATED APPLICATION

This application claims priority to Japanese Patent Application No. 2003-355040, filed Oct. 15, 2003, which application is herein expressly incorporated by reference.

FIELD OF THE INVENTION

The present invention relates to a shifting apparatus for an automatic transmission of a vehicle. The shifting apparatus has a shift lever movably supported relative to a bracket and a lock to limit and enable a swing motion of the shift lever from its predetermined position.

BACKGROUND OF THE INVENTION

Shifting apparatus for an automatic transmission of a vehicle have a shift lever that extends from a bracket mounted on a body of the vehicle. The apparatus has a desirable shifting operation relative to an automatic transmission of the vehicle and can be achieved by operating the shift lever fore and aft. In such a prior art shifting apparatus for an automatic transmission of a vehicle, such as Japanese Laid-open Patent Publication No. 132908/1996, the swing motion of the shift lever, an "operating lever" in the reference above, is limited when it is in the parking position (P) or the neutral position (N). Here, a push knob is provided at the top end of the shift lever and a pin on a rod lock pin, a "detent rod" in the reference above, is adapted to be lowered by the push knob. The pin is inserted in an erroneous operation preventing window, a detent engaging portion in the reference above, formed on the side of the bracket.

The shift lever is structured in order to prevent erroneous shift lever operation by a driver. Thus, the pin engages the erroneous operation preventing window to limit the swing motion of the shift lever when it is in the parking position (P) or the neutral position (N). On the other hand, swing motion of the shift lever is allowed by pushing down the push knob to lower the pin together with a rod lock pin and thus to release the engagement of the pin and the erroneous operation preventing window. The window is formed with stepped portions at positions corresponding to those of the park (P) and neutral (N) positions and the pin can engage or disengage such a stepped portion.

However, a problem exists in the prior art shifting apparatus for an automatic transmission of a vehicle in that the freedom of design is not sufficient since the descending distance of the pin is uniformly determined only by the displacement amount of the push knob. This is due to the fact that the pin, adapted to engage the erroneous operation preventing window, is formed on the rod lock pin and thus the former pin and the latter pin are integrated. Due to design requirements of the shifting apparatus for an automatic transmission of a vehicle, sometimes it is required to provide a desirable displacement amount of the push rod. On the contrary, since the displacement amount of the push knob and the descending amount of the pin are uniformly formed in the apparatus of the prior art, the rod lock pin itself must be changed in accordance with each form of the shifting apparatus. Since it is impossible to use the rod lock pin of the prior art as is, and due to recent increasing need to reduce the displacement amount of the push rod, the manufacturing cost is also increased.

SUMMARY OF THE INVENTION

It is therefore an object of the present invention to provide a shifting apparatus for an automatic transmission of a vehicle where the displacement amount can be easily and arbitrary set. Also, the shifting apparatus can be adapted to various forms to reduce its manufacturing cost.

To achieve the objects, a shifting apparatus for an automatic transmission of a vehicle comprises a shift lever movably supported relative to a bracket to be mounted on a body of vehicle. A push knob is arranged at a projected end of the shift lever and is operable in a pushing manner. An erroneous operation preventing window is arranged at the side of the bracket. A rod lock pin extends within the shift lever and is adapted to be lowered by the pushing down operation of the push knob. A lock mechanism is able to engage the erroneous operation preventing window to limit a swing motion of the shift lever from a predetermined position. The lock mechanism is operated by the descending motion of the rod lock pin to release the engagement with the erroneous operation preventing window in order to allow the swing motion of the shift lever from the predetermined position. The lock mechanism comprises a pivot member pivotable around a pivot shaft provided on the shift lever. The lock mechanism normally urged toward a limiting side of the swing motion of the shift lever and has a first branch adapted to engage and disengage the erroneous operation preventing window according to its pivot motion. The lock mechanism is pivoted with its first branch being pushed by the bottom end of the rod lock pin to release the engagement of the first branch from the erroneous operation preventing window when the rod lock pin is lowered.

According to the invention, the shifting apparatus, in addition to the first branch, is further provided with a second branch. The second branch is able to engage a shift lock stopper to limit the pivot motion of the pivot member. A third branch is able to engage a parking position sensor to detect that the shift lever is in a parking position as well as the pivot member is in an initial position.

According to the invention, the shifting apparatus further includes an urging mechanism to urge the rod lock pin toward the pivot member. Thus, the bottom end of the rod lock pin normally abuts the first branch of the pivot member.

According to the invention, since the first branch of the pivot member is released from engagement with the erroneous operation preventing window, by urging the bottom end of the rod lock pin to the first branch, the displacement amount of the push knob can be easily and arbitrary set only by changing the initial position of the pivot member. Thus, it is possible to apply the pivot member to various forms of shifting apparatus and accordingly reduce the manufacturing cost.

According to the invention, it is possible that the pivot member combines locking and unlocking functions of the pivot member, by the shift lock stopper, and of detecting function by the parking position sensor in addition to the engaging function with the erroneous operation preventing window. Furthermore, it is possible to easily change the arrangement positions of the shift lock stopper or the parking position sensor only by changing the arrangement positions and configurations of the second and third branches.

According to the invention, it is possible to make the rod lock pin always follow the action of the first branch.

Further areas of applicability of the present invention will become apparent from the detailed description provided hereinafter. It should be understood that the detailed description and specific examples, while indicating the preferred embodi-

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENTS

Figure 1:
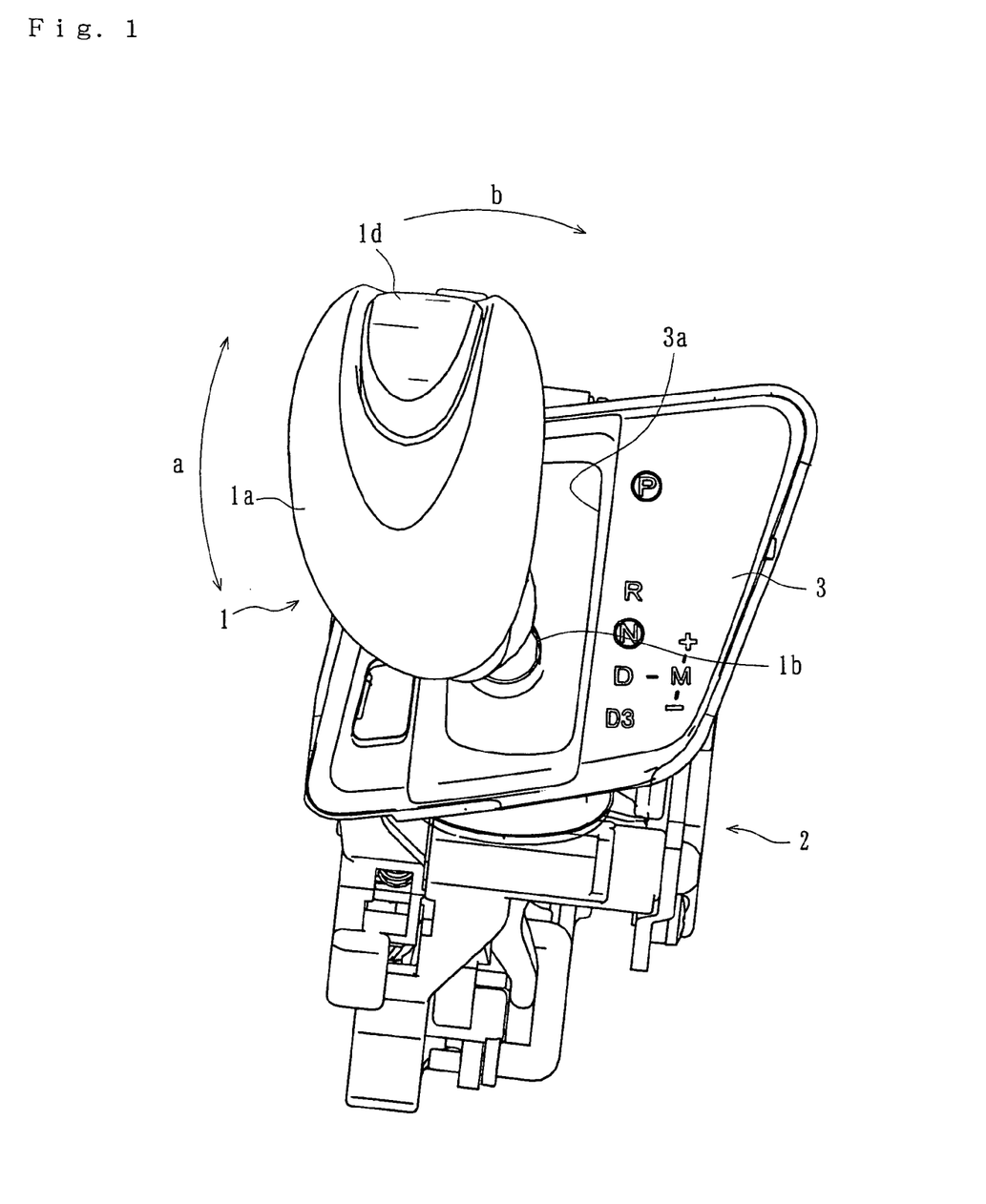
FIG. 1 is a perspective view of a shifting apparatus for an automatic transmission of a vehicle of one preferred embodiment of the present invention.

A shifting apparatus for an automatic transmission of a vehicle is of a type which can arbitrarily select either the automatic mode or the manual mode. The shifting apparatus external view mainly includes a shift lever 1, with a knob portion 1a and a lever portion 1b, a bracket 2, adapted to be mounted on a body of the vehicle, and an escutcheon 3 covering the bracket 2 as shown in FIGS. 1 through 3.

The shift lever 1 is supported so that it can move both in a fore and aft direction. The motion in direction "a" in FIG. 1 is herein referred to as "swing" or "swing motion". A left and right direction, direction "b" in FIG. 1, is herein referred to as "tilt" or "tilting motion". These motions are relative to members secured on the vehicle body such as the bracket 2 and escutcheon 3. In a usual condition, the shift lever 1 is moved in the swing motion direction in the automatic mode and changed to the manual mode by moving the shift lever 1 in the tilting motion direction. The hollow lever portion 1b extends from the knob portion 1a and passes through an elongated hole 3a formed in the escutcheon 3.

Figure 2:
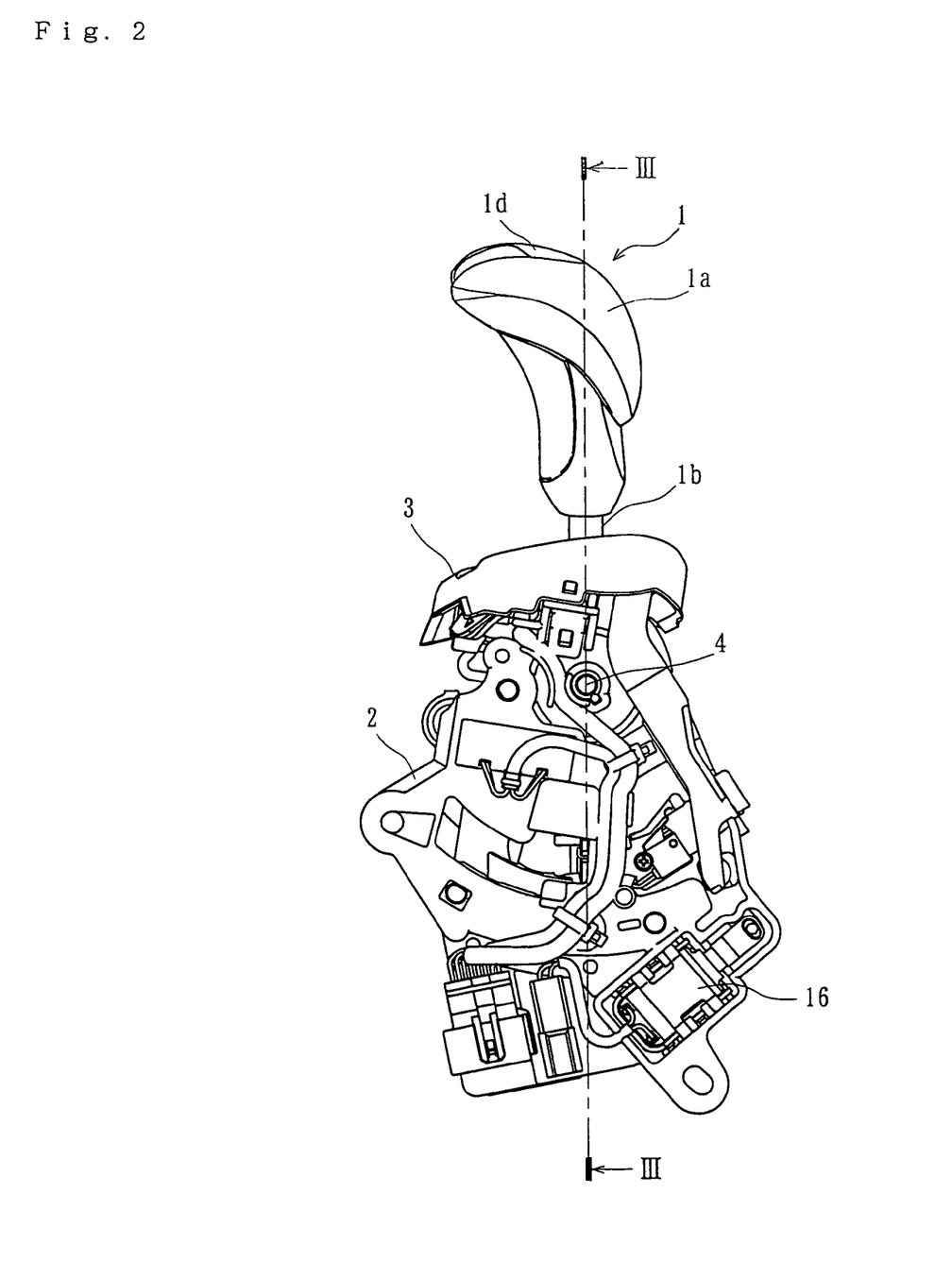
FIG. 2 is a right side elevation view of the shifting apparatus for an automatic transmission of vehicle of FIG. 1.
Figure 3:
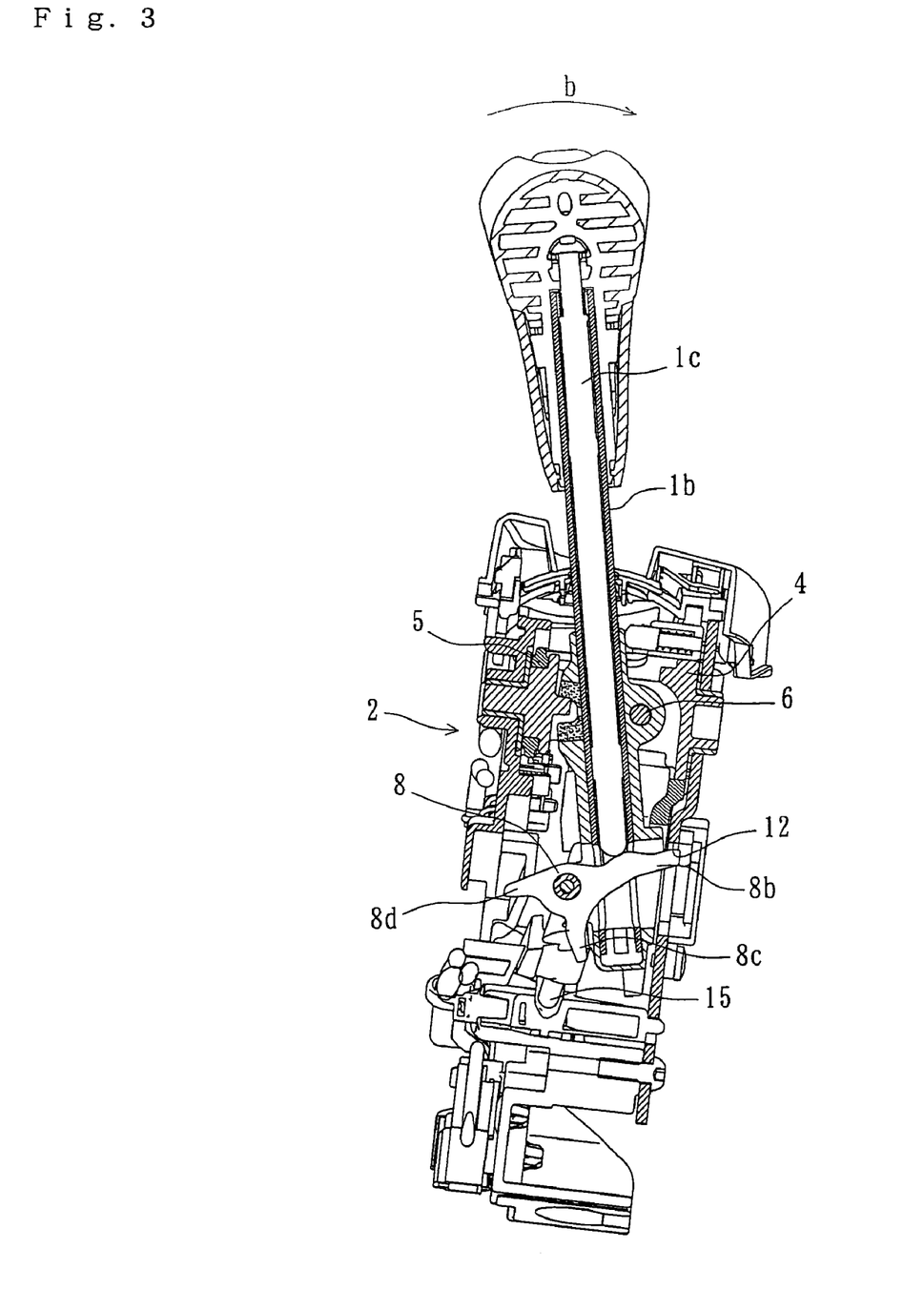
FIG. 3 is a cross-section view taken along a line III-III of FIG. 2.
Figure 4:
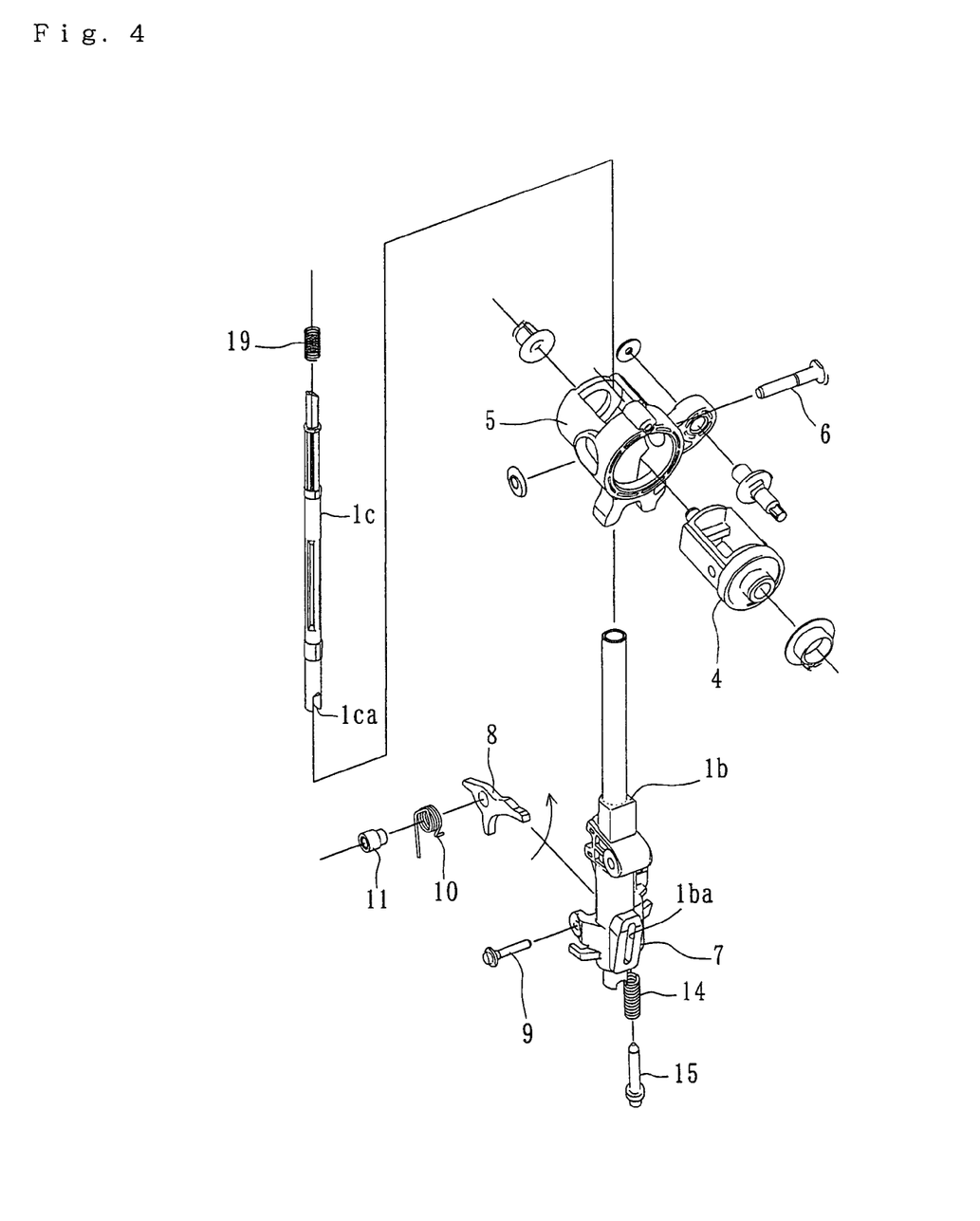
FIG. 4 is an exploded perspective view showing a shift lever, a pivot shaft, a wire bracket, a rod lock pin, etc.

The shift lever 1 can move in the swing motion direction (direction "a") around a pivot shaft 4 (FIG. 2). Also, the shift lever 1 can move in the tilting motion direction (direction "b") around a supporting pin 6 (FIG. 3) when the shift lever 1 is in the drive position (D). As shown in FIGS. 3 and 4, a rod lock pin 1c is inserted into the lever portion 1b of the shift lever 1. The rod lock pin 1c can be lowered by pushing down the push knob 1d (FIG. 2).

As shown in FIG. 4, the lever portion 1b of the shift lever 1 is inserted in apertures formed respectively in the pivot shaft 4 and a wire bracket 5 rotatably arranged on the pivot shaft 4. Also, the lever portion 1b is supported on the supporting pin 6. The shift lever 1 can move in both the swing motion direction (fore and aft direction) and in the tilting direction (left and right direction). The shift lever 1 can move not only in the swing motion direction around the pivot shaft 4 but in the tilting motion direction around the supporting pin 6 to be released from the connection to the wire bracket 5, which enables the manual operation of the transmission.

Figure 7:
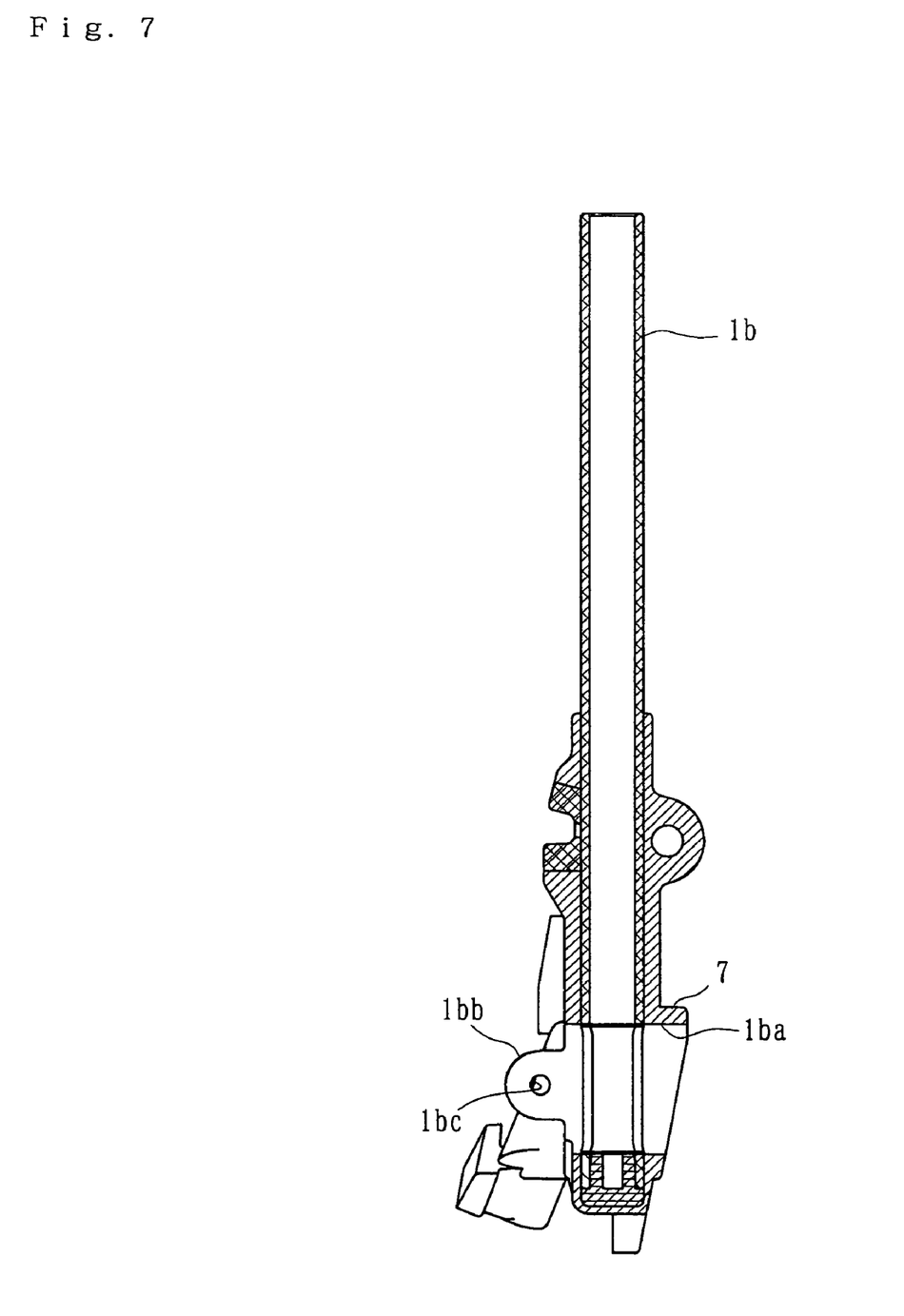
FIG. 7 is a longitudinal section view showing a lever portion of the shift lever of the shifting apparatus for an automatic transmission of vehicle.

One side of the bottom end of the lever portion 1b is formed with a bulged portion 7. The bulged portion 7 projects from the lever portion 1b at a predetermined amount which engages and is connected to the wire bracket 5 when the transmission is in the automatic mode, condition in which the shift lever 1 is not tilted. As shown in FIG. 7, the bulged portion 7 is formed with a lateral through aperture 1ba and a projection 1bb at its side. This projection 1bb is formed with an aperture 1bc to receive a pin 9. The pin 9 forms a pivot shaft for a pivot member 8 which functions as a locking member described in more detail below.

Figure 6:
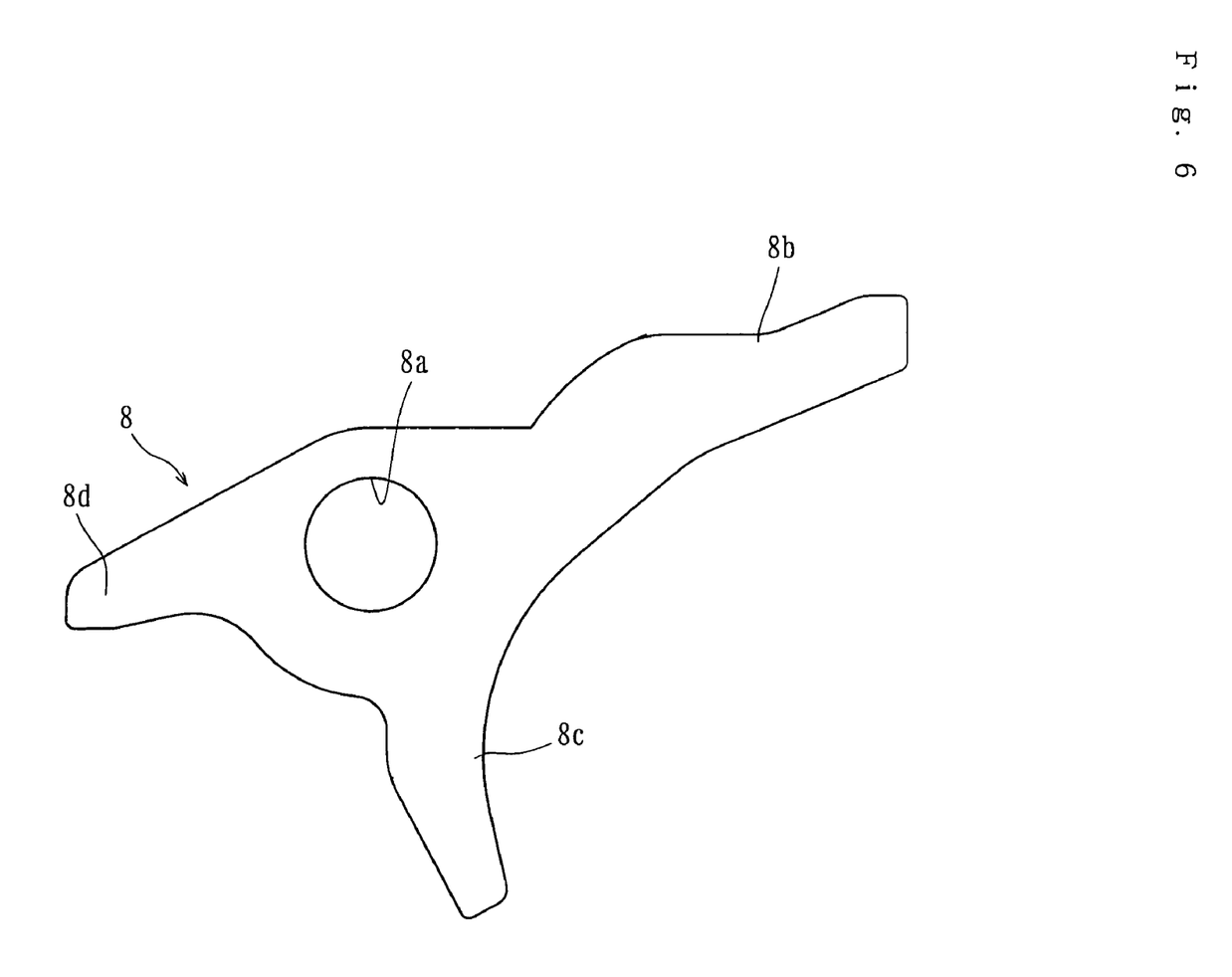
FIG. 6 is a schematic view showing a pivot member of the present invention.
Figure 8:
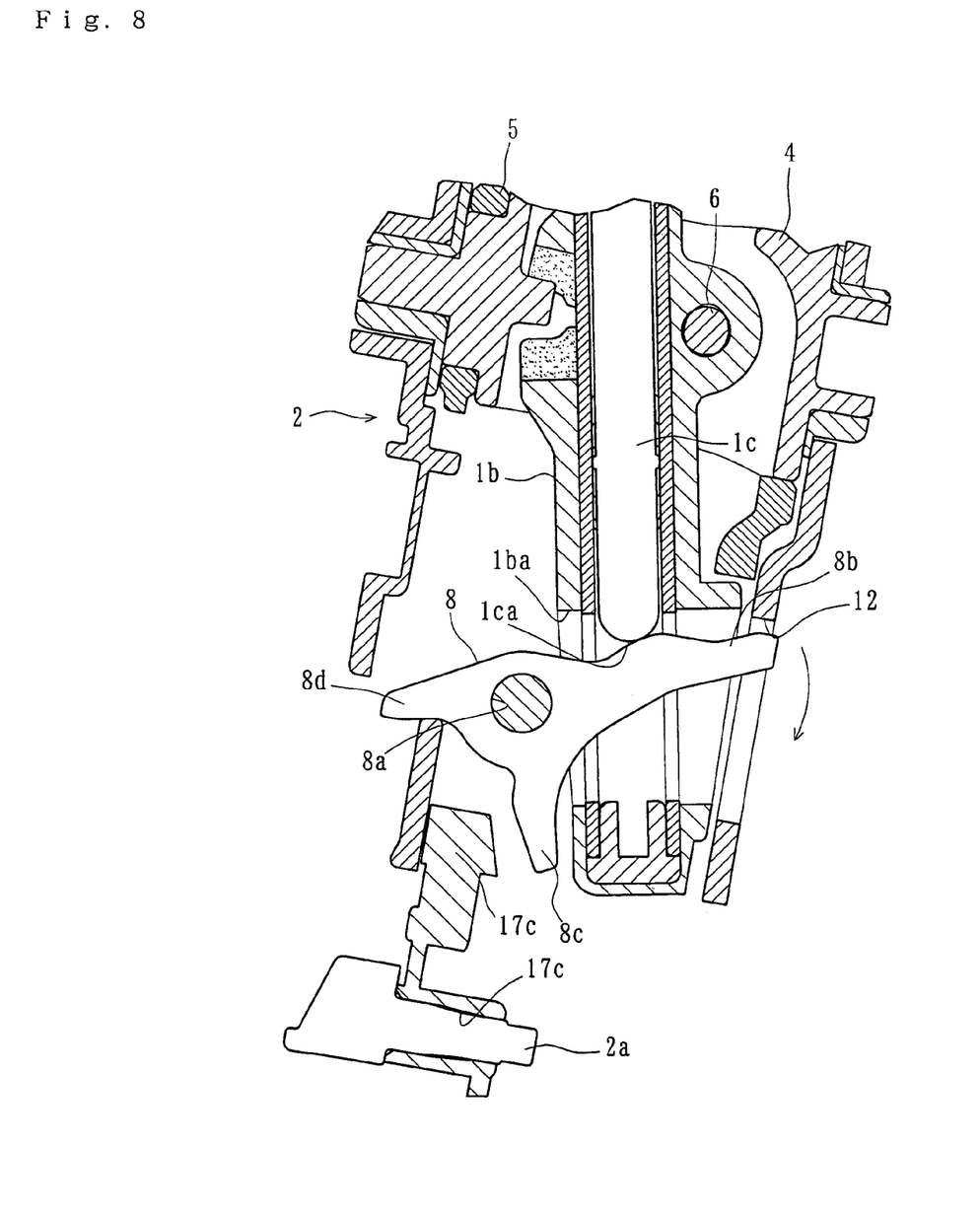
FIG. 8 is a cross-section view showing an assembled condition of a pivot member and a rod lock pin of the shift lever of the shifting apparatus for an automatic transmission of a vehicle.

As shown in FIG. 6, the pivot member 8 has a substantially central aperture 8a corresponding to the aperture 1bc in the lever portion 1b. The pivot member 8 has first, second and third branches 8b, 8c and 8d that project from the body of the pivot member 8. As shown in FIG. 4, the pivot member 8 is pivotably mounted on the lever portion 1b. The pivot member 8 is urged by a twist-coil spring 10 in a direction shown by an arrow, via a supporting member 11 and the pin 9 inserted in the aperture 1bc. When the rod lock pin 1c is lowered, by pushing down the push knob 1d, the pivot member 8 is pivoted against the urging force of the spring 10 around the pin 9. The first branch 8b is pushed by the bottom end 1ca of the rod lock pin 1c as shown in FIG. 8.

The distal end of the first branch 8b is designed so that it projects, by a predetermined amount, from an erroneous operation preventing window 12 formed at a side of the bracket 2. Under a condition in which the shift lever 1 is in the parking position (P) and the push knob 1d is not pushed down, the distal end of the first branch 8b is in a position "a" (FIG. 10) within the window 12 and engages a stepped wall of the window 12. Thus, the movement in the swing motion direction of the shift lever 1 toward the reverse position (R) is prevented. Then, if the push knob 1d is pushed down from this condition to lower the rod lock pin 1c, the first branch 8b is lowered and its distal end occupies a position "b" in FIG. 10.

Figure 10:
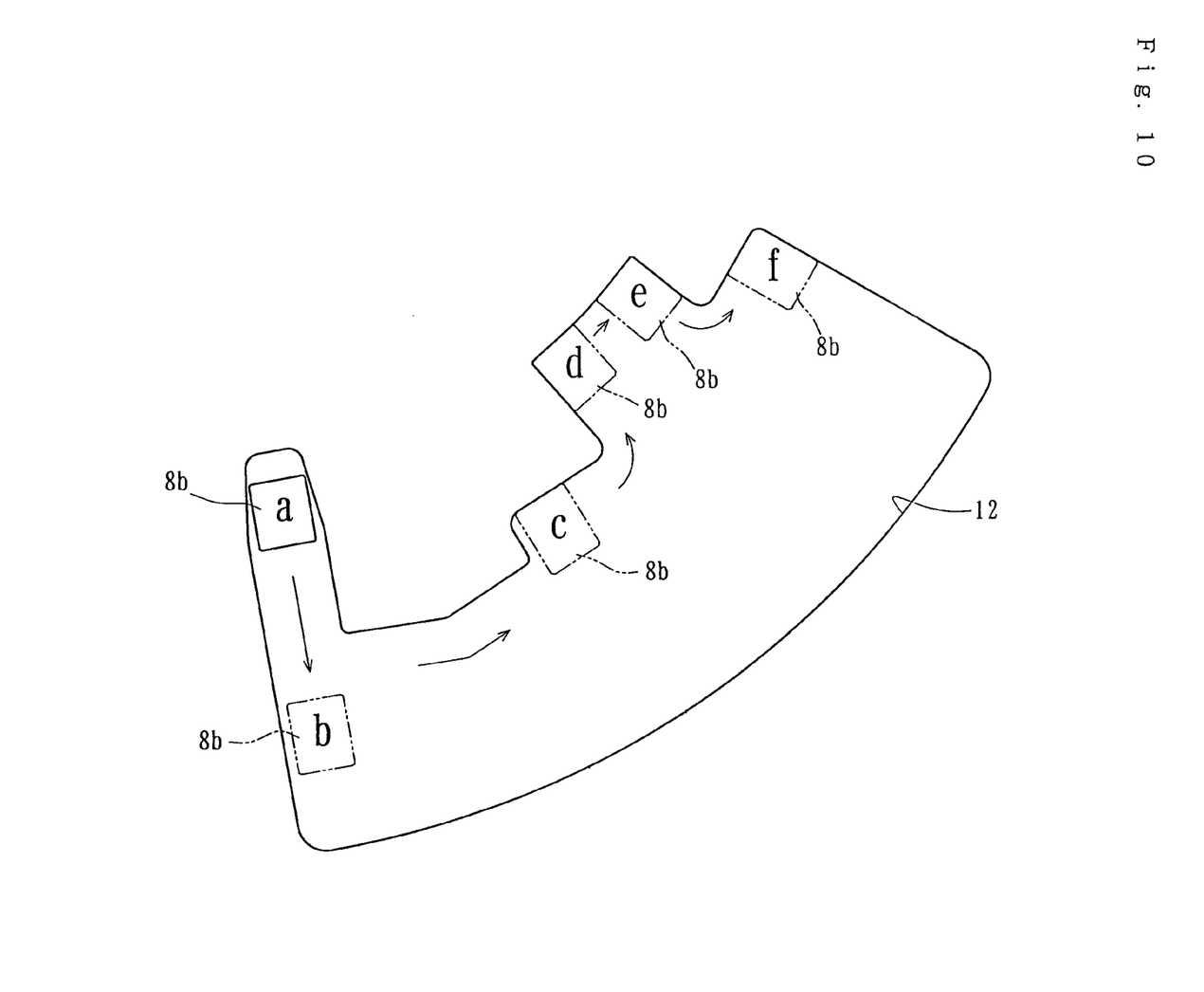
FIG. 10 is a schematic view for explaining a relative relation between an erroneous operation preventing window and a first branch of the pivot member.

Accordingly since the engagement of the distal end of the first branch 8b of the pivot member 8 with the side wall of the window 12 is released, the shift lever 1 can be moved in the swing motion direction toward, in order, a position "c", a position in which the shift lever 1 occupies the reverse position (R), a position "d", the neutral position (N), a position "e", the drive position (D), and finally a position "f", 3rd position (D3). In this case, when moving the shift lever 1 from the position (D) to the position (D3), from the position (N) to the position (R), or from the position (R) to the position (P), the pushing down operation of the push knob 1d is also required.

As can clearly be seen, the pushing down operation of the push knob 1d is required in order to move the shift lever 1 from the predetermined position to a desired position in the swing motion direction. Since the first branch 8b of the pivot member 8 can be released from engagement with the window 12 only by pushing down the push knob 1d, the displacement amount of the push knob 1d can be easily set at any desirable amount by only changing the initial position of the pivot member 8 and the configuration of the first branch 8b. Thus, the shifting apparatus for an automatic transmission of a vehicle of the present invention can be easily applied to various types of transmissions having different displacement amounts of the push knob and thus can reduce the manufacturing cost of the transmission.

Figure 5:
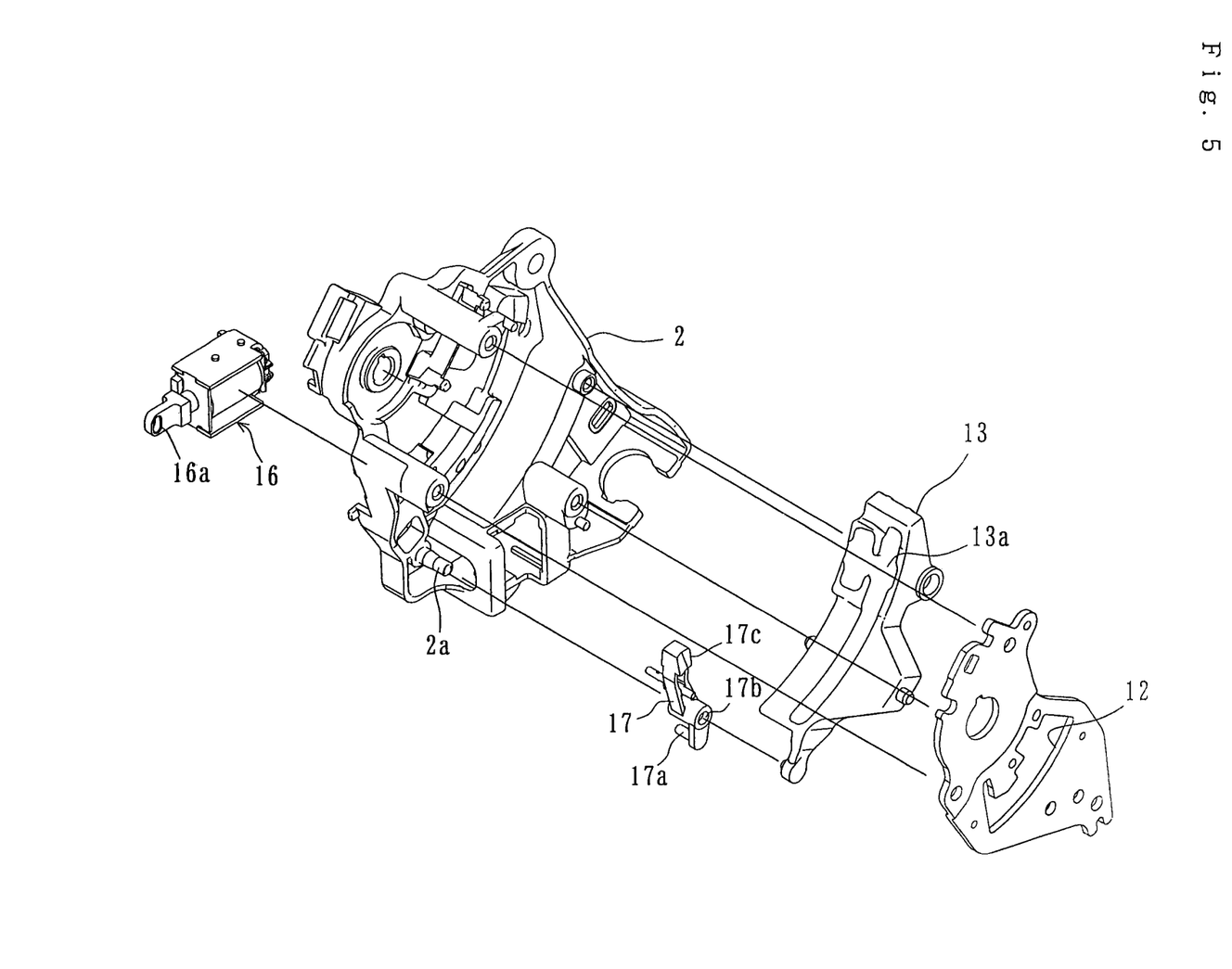
FIG. 5 is an exploded perspective view showing a bracket, a shift lock stopper, a detent plate, an erroneous operation preventing window, etc.

The bottom end of the lever portion 1b of the shift lever 1 is provided with a detent member 15, via a spring 14, which is adapted to be moved in accordance with the operation of the shift lever 1 along a groove 13a of a detent plate 13 shown in FIG. 5. The bottom surface of the groove 13a is formed with a predetermined wave configuration giving a moderate resistant feeling to a driver of the vehicle when he operates the shift lever 1. A shift lock stopper 17 is interposed between the detent plate 13 and the bracket 2.

The shift lock stopper 17 is formed with a projection 17a, which extends toward the bracket 2, an aperture 17b, which receives a boss 2a formed on the bracket, and a limiting portion 17c, which can be engaged or disengaged by the second branch 8c of the pivot member 8. A solenoid 16 is mounted on the bracket 2. The solenoid 16 has an actuating rod 16a extendable in accordance with an electric signal. The signal detects that the brake pedal has been depressed. The actuating rod 16a is adapted to be engaged by the projection 17a of the shift lock stopper 17.

Figure 9:
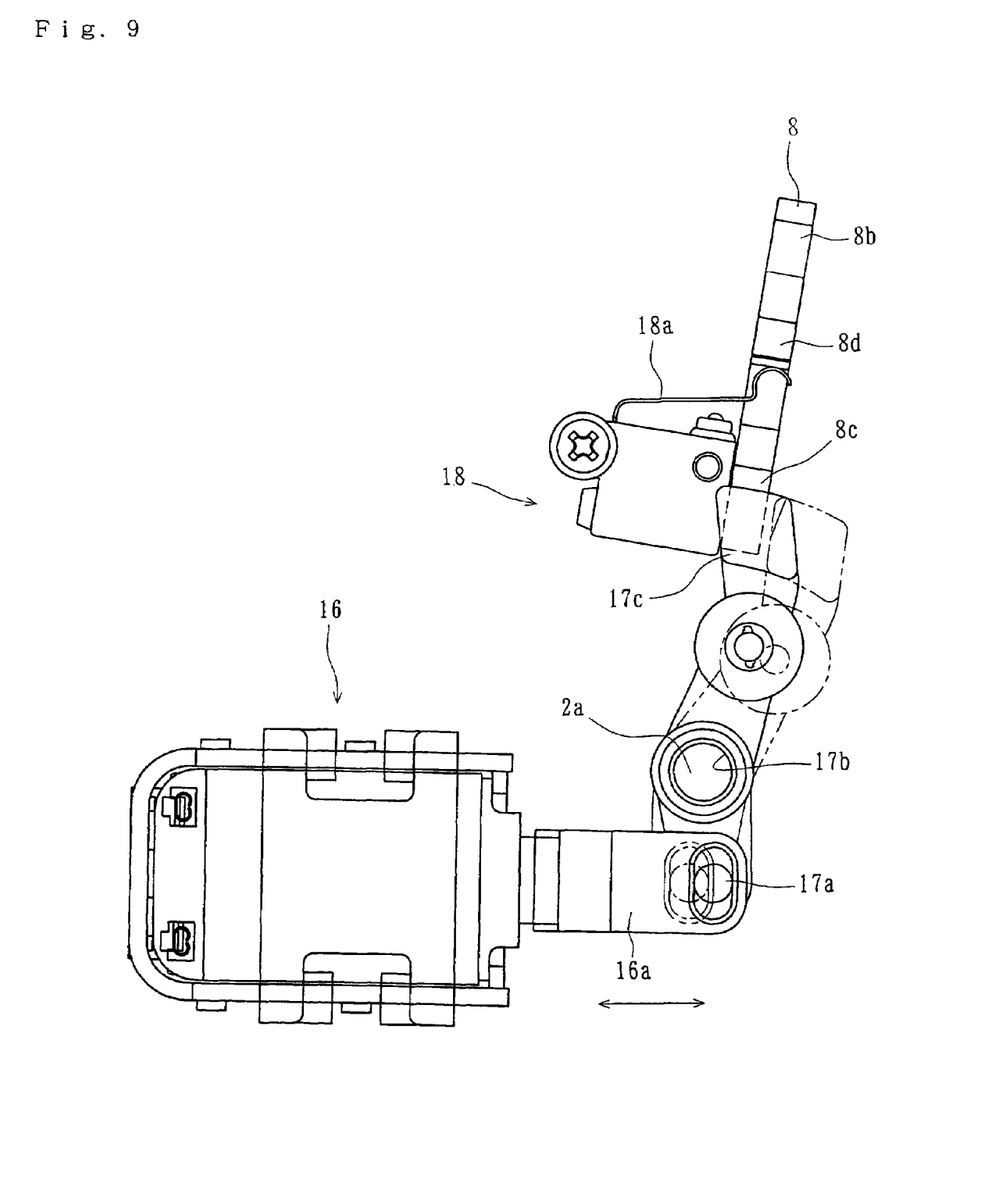
FIG. 9 is a schematic view showing a relative relation among a solenoid, shift lock stopper, and a pivot member as well as a relative relation between a parking position sensor and a pivot member of the shifting apparatus for an automatic transmission of vehicle.

Accordingly as shown in FIGS. 8 and 9, under a condition where the brake pedal is not depressed as well as the actuating rod 16a of the solenoid 16 is extended, the limiting portion 17c abuts the second branch 8c to limit the pivotal motion of the pivot member 8, see a condition shown by a solid line in FIG. 9. On the other hand, when another sensor detects that the brake has been depressed and sends this signal to the solenoid 16, the actuating rod 16a is contracted and rotates the shift lock stopper 17 around the boss 2a to separate the limiting portion 17c from the second branch 8c, see a condition shown by a two-dot chain line in FIG. 9. Thus, the pivot member 8 is allowed to be pivoted by the descending motion of the rod lock pin 1c caused by the pushing down operation of the push knob 1d.

Also as shown in FIG. 9, a parking position sensor 18, comprised of a micro switch, is arranged on the bracket 2 near the pivot member 8. The parking position sensor 18 has an actuating member 18a. The actuating member 18a is able to engage the third branch 8d of the pivot member 8 and can detect that the shift lever 1 is in the park position (P). The pivot member 8 is in the initial condition, the condition where the pivot member 8 is not pushed by the rod lock pin 1c. When the pivot member 8 is in the pivoted condition, the actuating member 18a is separated from the third branch 8d. When the pivot member 8 is in the initial condition, not in the pivoted condition, the third branch 8d abuts the actuating member 18a to push it to the detecting position to detect that the pivot member is in the initial condition. If this is detected, it is possible to pull out a key of the vehicle from its key hole.

According to the above structure, it is possible to provide a combination of functions on the pivot member 8 such as, the locking and unlocking function of the pivot member by the shift lock stopper 17, the detecting function by the parking position sensor 18, and the engaging function with the erroneous operation preventing window. In addition, it is possible to easily change the arrangement positions of the shift lock stopper or the parking position sensor etc. only by changing the arrangement positions and the configurations of the second and third branches 8c and 8d. Although in the illustrated embodiment the pivot member 8 is formed with both the second and third branches 8c and 8d to carry out the engagement with the shift lock stopper 17 and the detection by the parking position sensor 18, it is possible to provide either one of the second and third branches and to carry out the other functions with using separate locking mechanisms or sensors.

Furthermore, an urging means 19, comprised of a coil spring, is mounted on the top end of the rod lock pin 1c to normally urge the rod lock pin 1c downward. This makes it possible for the bottom end 1ca of the rod lock pin 1c to always be in contact with the first branch 8b of the pivot member 8 and to always follow the rod lock pin 1c to the operation of the first branch 8b. The urging force of the urging member 19 is set so that it is smaller than that of the twist-coil spring 10.

The present invention has been described with reference to the preferred embodiment. Obviously, modifications and alternations will occur to those of ordinary skill in the art upon reading and understanding the preceding detailed description. For example, the shifting apparatus for an automatic transmission of a vehicle of the present invention can be applied for example to an automatic transmission having only the automatic mode and not having the manual mode, i.e. an automatic transmission in which the shift lever can move only in the swing motion direction, fore and aft direction, and cannot move in the tilting motion direction, left and right direction. In addition, the twist-coil spring 10 for urging the pivot member 8 as well as the urging member 19, comprised of a coil spring, may be replaced by any other urging means.

The present invention can be applied to any other shifting apparatus for an automatic transmission of a vehicle having different external views in so far as the lock mechanism is formed by a pivot member so that it can engage the erroneous operation preventing window so as to limit the swing motion of the shift lever from a predetermined position as well as to allow the swing motion of the shift lever from the predetermined position, by lowering the rod lock pin, to release the engagement of pivot member with the window by pushing down the push knob.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A shifting apparatus for an automatic transmission of a vehicle comprising:
   a shift lever movably supported relative to a bracket to be mounted on a body of vehicle;
   a push knob arranged at a projected end of the shift lever and operable in a pushing manner;
   an erroneous operation preventing window arranged at the side of the bracket, said erroneous operation preventing window including a plurality of shift lever retention positions;
   a rod lock pin extending within the shift lever and adapted to be lowered by the pushing down operation of the push knob; and
   a lock mechanism able to engage the erroneous operation preventing window for limiting a swing motion of the shift lever from a predetermined shift lever retention position and operated by the descending motion of the rod lock pin for releasing engagement with the erroneous operation preventing window in order to enable the swing motion of the shift lever from the predetermined shift lever retention position into another shift lever retention position of said plurality of shift lever retention positions;

said lock mechanism comprises a pivot member pivotable around a pivot shaft provided on the shift lever and normally urged toward a side limiting the swing motion of the shift lever, said pivot member having a first branch adapted to engage and disengage said plurality of shift lever retention positions in said erroneous operation preventing window according to its pivot motion, said lock mechanism being pivoted with its first branch being pushed by the bottom end of the rod lock pin to release the engagement of the first branch and said shift lever retention position of the erroneous operation preventing window when the rod lock pin is lowered.

2. A shifting apparatus for an automatic transmission of a vehicle of claim 1, wherein said pivot member, in addition to the first branch, further comprises a second branch being able to engage a shift lock stopper for limiting the pivot motion of the pivot member, and a third branch being able to engage a parking position sensor for detecting that the shift lever is in a parking position as well as the pivot member is in an initial position.

3. A shifting apparatus for an automatic transmission of a vehicle of claim 1 further comprising a urging member for urging the rod lock pin toward the pivot member so that the bottom end of the rod lock pin normally abuts the first branch of the pivot member.

* * * * *